United States Patent Office 3,572,130
Patented Mar. 23, 1971

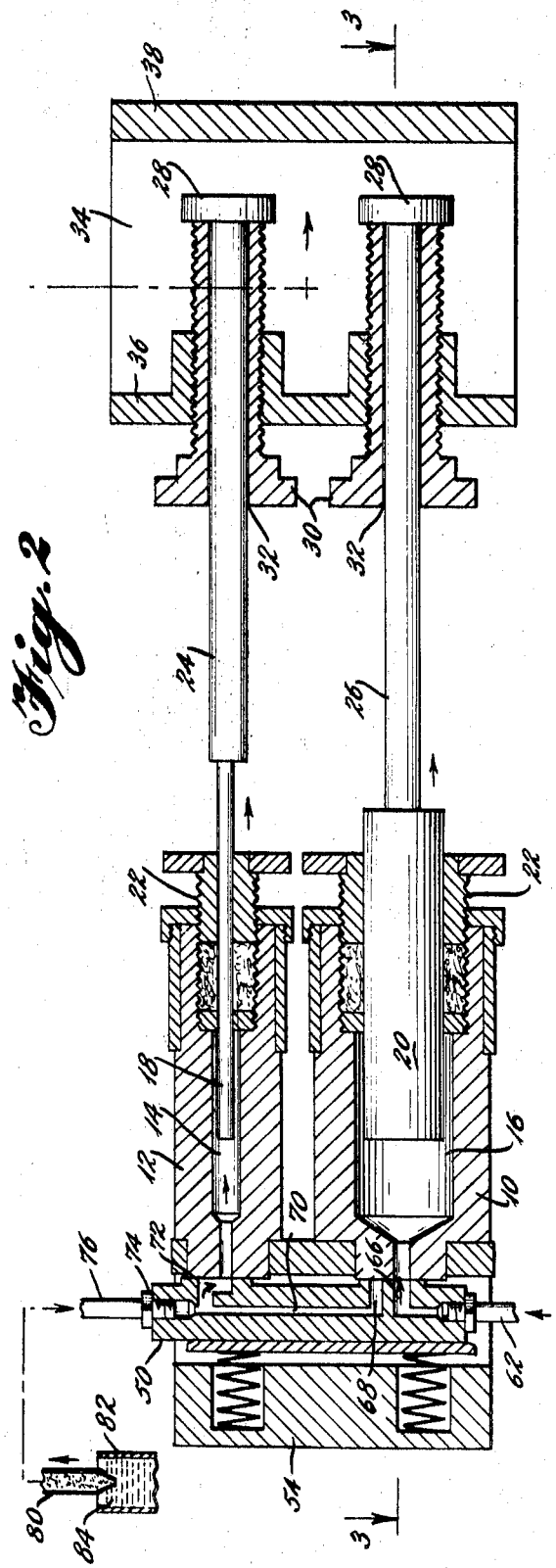
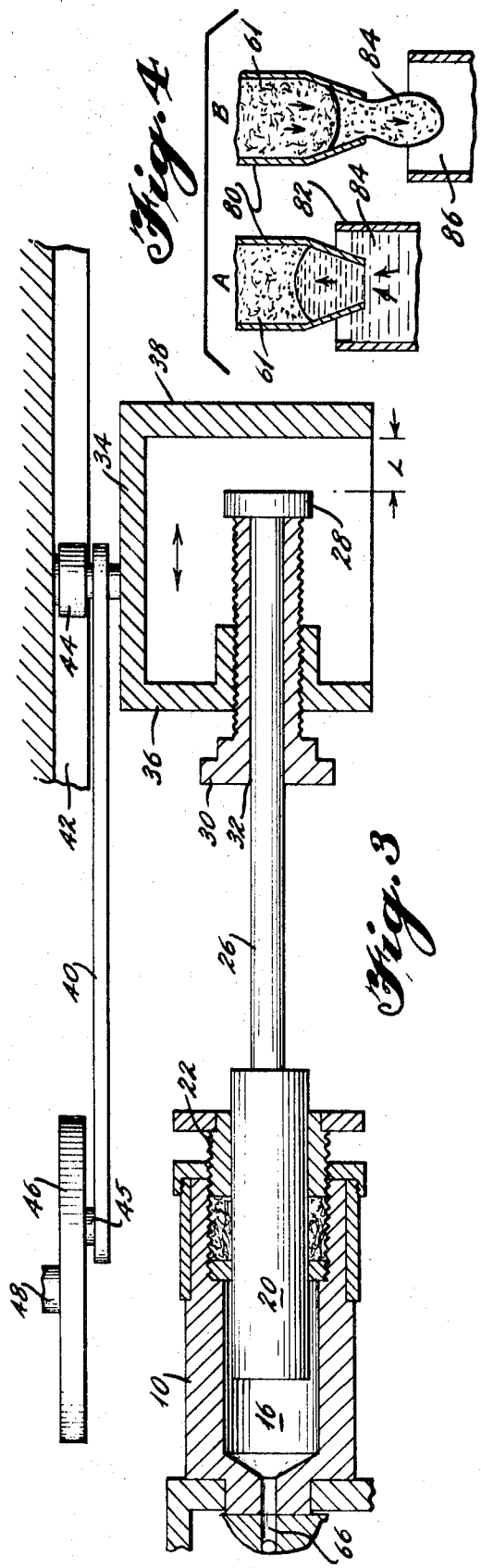

3,572,130
LIQUID SAMPLE PICK-UP AND DISPENSING
APPARATUS
Herbert Goldsmith, Rockville, Md., assignor to National
Instrument Laboratories, Inc., Rockville, Md.
Filed Aug. 27, 1969, Ser. No. 853,415
Int. Cl. G01n 1/14
U.S. Cl. 73—425.6                                    4 Claims

ABSTRACT OF THE DISCLOSURE

The present invention is directed to an apparatus for sucking up controlled amounts of liquid sample and thereafter dispensing the liquid sample along with controlled amounts of a diluent liquid. The apparatus comprises a pair of plunger pumps having a common pump actuating means. Diluent liquid enters the pumps through a slide valve having a liquid inlet passage open only to one pump during the suction stroke, drawing diluent thereto from a diluent source. The slide valve also has an outlet channel and outlet passage tube open to the same pump only during the pumping stroke, but open at all times to the other pump. The suction stroke of the pumps serves to draw diluent into the one pump from the inlet passage and at the same time sucks diluent back from the outlet passage into the other pump, and draws a small controlled quantity of sample up into the end of the outlet passage tube. During the pressure stroke diluent is pumped from both pumps into the outlet passage tube expelling all of the sample therefrom as well as a controlled amount of diluent. A lost motion pump actuating means is provided so that the slide valve shifts when no pumping occurs.

This invention relates to a liquid sample pick-up and dispensing apparatus, and more particularly to an apparatus for taking up a controlled amount of liquid sample and for delivering same along with a controlled amount of diluent.

A long-standing problem in biochemical and other analysis of material dissolved in liquids revolves around the need for accurate metering of the individual liquid sample being subject to analysis. A need exists also for accurate metering of any diluent added to the sample prior to or during analysis thereof. The metering problems are particularly severe when the analytic procedures are to be carried out routinely by laboratory technicians or by automated equipment in great numbers.

The object of the present invention is to provide a highly accurate liquid sample pick-up and dispensing device.

A further object is to provide an accurate sample pick-up and dispensing device capable of incorporation into an automated analysis system.

Subsidiary objects and the advantages of the present invention will become apparent from the description of the device which follows.

Briefly stated, the present invention employs a dual plunger pump arrangement to pick up small quantities of liquid, i.e. the sample, on their common suction stroke and to deliver the same along with an accurately predetermined quantity of diluent liquid on their pressure stroke. Only diluent liquid passes through both plunger pumps. The sample pick-up during the suction stroke draws liquid only into the end portion of the discharge tube or line from the plunger pumps.

The plunger pumps are associated with a slide valve having therein a liquid inlet passage for the diluent liquid open only to one pump during the suction stroke, and blinded off during the pressure or pumping stroke. The slide valve has therein an outlet channel and outlet passage tube open to the same pump only during the pumping stroke, but open at all times to the other pump, i.e. the sample pump. The suction stroke then draws diluent into one pump, i.e. the diluent pump, through the inlet passage. The suction stroke also draws diluent into the sample pump from the outlet passage tube applying the suction to the terminus of the tube which then draws liquid sample thereinto. The pumping stroke forces diluent from both pumps out through the outlet channel and outlet passage tube, discharging the sample and flushing same out with considerable diluent.

A common pump actuating means is provided for the two pumps, the actuating means being provided with a lost motion structure which serves to disconnect the plungers from their driving element at the end of both suction and pumping strokes.

For a clear understanding of the structure of the present invention, reference is now made to the attached drawings wherein:

FIG. 1 diagrammatically illustrates the overall apparatus during the pumping portion of the cycle;

FIG. 2 shows the two plunger pumps during the suction part of the cycle;

FIG. 3 is a partial section taken along lines 3—3 of FIG. 2; and

FIG. 4 is an enlarged view of the sample pick-up and discharge elements.

Figure 1:
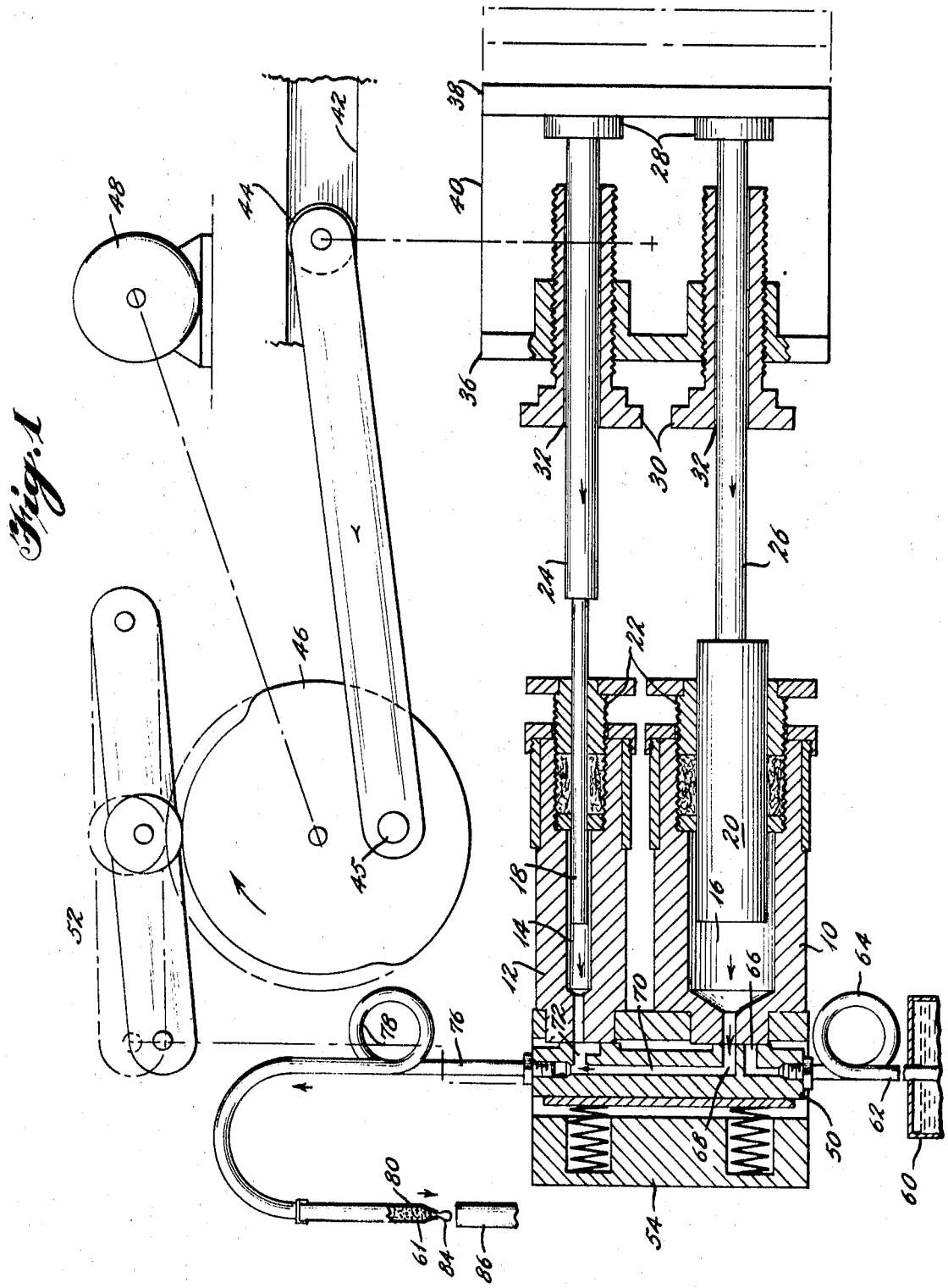

It may be noted that the drawing illustrates only structure essential to the invention, omitting some conventional features present in the plunger pumps.

The dual pump structure of the present invention involves a relatively large diluent pump 10 and a much smaller sample pump 12, both of cylindrical configuration associated for simultaneous actuation by a common actuating means. A plunger piston 18 and piston rod 24 are associated with the pumping chamber 14 of sample pump 12. Plunger piston 20 and piston rod 26 are associated with the pumping chamber 16 of diluent pump 10. Each of the pumping chambers 14 and 16 is sealed off by conventional packing structure 22 through which the associated piston or plunger 18 or 20 reciprocates. While packing structure 22 is conventional, it may be noted that stiff packing is desired for its high level of frictional drag. An abutment plate 28 secured to the base end of each piston rod 24 and 26 serves as the actuating element for the plunger pumps.

The pump actuating structure (FIG. 3) comprises a U-shaped carriage 34 formed with front wall 36 and rear wall 38. During the pumping stroke (illustrated in FIG. 1) the rear wall 38 bears against abutment place 28 causing pumping movement of plunger pistons 18 and 20 into their chambers 14 and 20. Front wall 36 of carriage 34 has mounted therein a pair of adjustment screws 30 each with a central bushing 32 in which piston rods 24, 26 reciprocate. Reverse motion of carriage 34 (illustrated in FIG. 2) causes the abutment plates 28 to contact the base of adjustment screws 30 drawing plunger pistons 18 and 20 outwardly of chambers 14 and 20 creating thereby the suction stroke of the pumps.

A carriage crank 40 reciprocates back and forth in channel 42, being connected at its channel end to carriage 34 by the crank pin 44 which rides in channel 42. The other end of carriage crank 40 is secured by a pin 45 to cam 46 which in turn is driven by an electric motor 48.

Allusion has already been made to how the pump actuating mechanism provides for lost motion at both ends of the plunger stroke. The extent of the lost motion is indicated in FIG. 3 by the L, this being the distance traversed by carriage 34 in the forward or pumping direction before rear wall 38 contacts abutment plate 28 and pumping motion of plunger 20 can commence. Conversely (as may be seen in FIG. 1) the same distance must be traversed rearwardly by front wall 36 before the base of adjustment screw 30 contacts plate 28 and the suction stroke can commence. During this lost-motion period no movement of plunger pistons 18, 20 occurs. This portion of the pumping cycle is a dead zone of neither pumping nor suction and provision has been made for valve movement during this non-movement portion or dead zone in the pumping cycle. A valve crank 52 which rides on the periphery of cam 46 (FIG. 1) shifts slide valve 50 back and forth between pumping position and suction position during the dead zone.

Slide valve 50 which surmounts the head of both diluent pump 10 and sample pump 12 is maintained in sealing relationship thereto by a spring biased pressure plate assembly 54 which may be of a conventional structure. A diluent reservoir 60 feeds diluent 61 therefrom to a diluent inlet tube 62 to an inlet port and channel 66 in slide valve 50. The passageway of inlet port and channel 66 terminates in a blind opening at the face of diluent pump 10 when slide valve 50 is in pumping position, illustrated in FIG. 1, and leads directly to pump chamber 16 in the suction position, as shown by FIG. 2. The pumping outlet channel 70 of slide valve 50 is connected to the outlet port leg 68 of pump 10 and to an inlet-outlet pump port 72 of sample pump 12 and terminates at an outlet fitting 74 of slide valve 50. The port 72 is open to the sample pump chamber 14 in both suction and pumping positions of slide valve 50 while separate inlet and outlet connections have been provided for diluent pump 10. The liquid pumped through outlet fitting 74 passes through an outlet tube member 76 to the sample tube 80 and then into a sample receiver 86.

Since the sample pick-up and dispensing apparatus as a whole is specifically adapted for analytical purposes, possible movement of sample discharge tube 80 is contemplated e.g. from a sample receiving station to a sample dispensing station. Employment of a flexible tubing for inlet tube 62 and outlet tube 76 is contemplated. Inclusion of inlet loop 64 and an outlet loop 78 permits more flexible movement of sample tube 80 and the end of inlet 62 without stressing the connections of the inlet and outlet tubes to slide valve 50. Conversely shift of slide valve 50 between pumping and suction positions does not then affect the other tube ends.

Some allusion has been made to the existence of a substantial volumetric difference between the relatively large and diluent pump chamber 16 and the relatively much smaller sample pump chamber 14. The suction strike of pump 12 acts to draw a relatively small quantity of sample 84 up into sample tube 80 an amount usually measured in microliters. FIG. 4 illustrates the suction action drawing up a small quantity of sample 84 into the end of tube 80 from a source 82. The liquid drawn back inside sample pump chamber 14 from tube 76 is pure diluent liquid 61. The volumetric capacity of tube 76 is far greater than that of pump chamber 14. During the pumping stroke liquid from diluent pump chamber 16 and the liquid from sample pump chamber 14 are pumped through outlet tube 76 and sample tube 80 into receiving chamber 86 discharging sample liquid 84 from the end of tube 80 along with a substantial quantity of diluent, specifically a quantity of diluent constituting the entire volumetric charge of diluent pump chamber 16.

The operation of the sample pick-up and dispensing apparatus of the present invention will now be described, starting with that point in the cycle illustrated in FIG. 2 when the suction stroke commences. Carriage crank 40 is moving carriage 34 to the right, the direction indicated by the arrows, and the base of adjustment screws 30 have contacted abutment plates 28. Slide valve 50 is in the suction stroke position shown in FIG. 2. During the suction stroke movement of plunger piston 20 diluent liquid 61 is drawn up from source 60 into pump chamber 16 in an amount corresponding to the displacement of pump 10. At the same time sample liquid 84 is drawn up into the end of sample tube 80 to a volume exactly matching the suction stroke displacement of sample pump 14. Since the actual volume of liquid present inside sample tube 80 and outlet tubing 76 is more than the displacement of pump 12, sample liquid 84 is never drawn beyond the confines of sample tube 80, and usually not beyond the lower portions thereof. Diluent liquid from tubing 76 fills sample pump chamber 14 during the suction stroke. The suction stroke continues until the reciprocating carriage crank 44 reaches its dead center position in channel 42 so to speak. At this dead center position the powered suction stroke is complete. Continued rotation of cam 46 by motor 48 now reverses the direction of carriage 34 by drawing carriage crank 40 and carriage pin 44 at the channel end of carriage crank 40 to the left and drawing the base of adjustment screw away from piston rod end plates 28. Frictional engagement of each packing assembly 22 with its respective pump plunger piston 18, or 20 is intentionally high to absorb the momentum of piston rods 24 and 26 and their plunger pistons 18, 20, stopping their movement almost instantly.

During the dead zone or lost motion period while carriage crank pin 44 is travelling in channel 42 from its dead center position, the lost motion distance L abutment plate 28 is no longer in contact with the base of adjustment screw 30 nor is it yet in contact with the rear wall 38 of carriage 34. Pumps 10, 12 are in a quiescent state; neither pressure nor suction is being applied to pump chambers 14, 16. At this time cam 46 shifts valve crank 52 down (along the periphery of cam 46). Valve crank 52 in turn shifts slide valve 50 from its suction position to its pumping position, the latter being illustrated in FIG. 1. Shifting slide valve 50 during a dead zone is most advantageous since absence of pumping motion avoids errors due to pumping surges during the valve shift. In addition, use of a slide valve is itself advantageous because this type of valve involves no displacement of liquid and therefore does not add the minor undesirable pressure surges commonly present with other types of valves.

Subsequent to the shift of valve 50 from suction to pumping carriage crank pin 44 completes movement in channel 42 the full distance L carrying the rear wall 38 of carriage 34 into contact with abutment plates 28. The pumping movement of plunger pistons 18, 20 illustrated in FIG. 1 then begins and continues until carriage crank 40 reaches its other dead-center position. During the pumping stroke, pumps 12 and 10 discharge diluent liquid into tubing 76 first forcing the sample 84 out the end of sample tube 80 into a suitable receiving vessel 86 (as illustrated in FIG. 4B). The relatively large quantity of diluent liquid 61 pumped out of diluent pump 16 washes all traces of the sample 84 from tube 80 thereby placing tube 80 in position to receive once again uncontaminated fresh sample. Pumping action ends instantly when carriage crank 40 passes its dead-center position (to the left) and once again commences a return stroke. The moment rear wall 38 loses contact with abutment plates 28 a second dead zone lost motion period commences. During this dead zone lost motion period valve crank 52 rides up on cam 46 causing slide valve 60 to shift from pumping position to the suction position. After carriage crank pin 44 has travelled the lost motion distance L, the base of adjustment screws 30 contact abutment plates 28 and the suction stroke begins.

Association of the reciprocatory motion of cam 46 and carriage crank 40 with the linear movement of pump plunger pistons 18, 20 is advantageous. The reciprocatory movement creates relatively rapid linear movement of carriage crank pin 44 in channel 42 during the middle portions of both suction and pumping strokes and a progressively slower linear movement as the termination of each stroke approaches until at the dead-center position no linear movement occurs. Thus at the end of each stroke this characteristic of reciprocatory movement is already slowing piston movement facilitating the frictional drag action of stiff packing 22 to stop piston movement virtually instantly at dead-center. The concomitant acceleration of the linear movement of carriage crank pin 44 and carriage 34 which is occurring at the expiration of the lost motion when contact with abutment plate 28 occurs has no adverse affects on pumping or suction action. However, the absence of movement at dead center is too brief for valve shift (with no pressure surges), making desirable the more extended dead zone provided by the lost motion period for valve shifts.

Existence of the two lost motion dead zone periods allows also for a measure of adjustability in the system. The exact position of adjustment screw 30 can be changed for either of the pumps 10 and 12. While the drawings show the same stroke length, they need not be so. A different lost motion distance L may be provided for each pump.

The two lost motion dead zone periods have other advantages. They are periods when no pumping occurs, so during these periods motor 48 may be stopped and started, facilitating thereby an intermittent operation of the sample pick-up and discharge apparatus.

Allusion has repeatedly been made to association of the sample and pick-up and dispensing apparatus of the present invention with equipment for analyzing the sample. Such equipment, e.g. so-called automatic laboratories, often uses an intermittent motion. The sample pick-up and dispensing mechanism must then be completely halted from time to time as for example for whatever time is required for the reservoir 82 containing sample solution 84 to move into position under sample tube 80 (just prior to a suction stroke). Then after a suction stroke, the present apparatus may stop until reservoir 82 is received and a sample receiving tube 86 has been positioned beneath sample tube 80 for discharge thereinto of sample 84 and diluent 61 by the pumping stroke. Conventional microswitches and electrical circuitry are contemplated in association with the sample pick-up and delivery apparatus of the present invention for starting and stopping electric motor 48 as required by whatever analytical equipment is used with the present apparatus. Important, however, to the present invention is that the start and stop movement takes place during the lost motion dead zone when neither pumping nor suction occurs.

In terms of the sample pick-up and dispensing structure of the present invention, it may be noted however that starting and stopping of electric motor 48 involves coasting and other irregularities which could create pressure surges and constitute sources of actual error if the dead zone of the lost motion period were not present for carrying out the start and stop intermittent movement commonly employed in automatic analytical equipment.

What is claimed is:
1. A sample pick-up and dispensing apparatus comprising:

a pair of plunger pumps, one for sample, the other for diluent, a common pump actuating means therefore including lost motion at the termination of each pump plunger stroke of the pump pair;

a common slide valve for both plunger pumps, said slide valve having therein a liquid inlet passage and a liquid outlet channel alternatively connected to the diluent pump during the suction stroke and pumping stroke respectively, said outlet channel further being connected to the sample pump in both the suction and pumping positions of said slide valve; and means for changing said slide valve between a suction position and a pumping position, said valve changing means being associated with the pump actuating means to shift said slide valve from one position to the other position during the lost motion period at the termination of the plunger strokes.

2. The apparatus of claim 1, wherein said pump actuating means includes a reciprocating carriage having a rear wall and a forward wall spaced apart one from the other, the front wall being apertured; and wherein the plunger piston means elements of both pumps extend through the apertured front wall, each terminating in a bearing means whereby on the pumping stroke the rear wall urges the bearing means in pumping direction and on the suction stroke the front wall structure urges the bearing means in suction direction, lost motion taking place at the termination of each stroke during the period the carriage moves whatever distance lies between contact by the front wall structure and the rear wall on the bearing means.

3. The apparatus of claim 2, wherein the apertures in the front wall of the reciprocating carriage have associated therewith adjustment means whereby the extent of the lost motion period may be individually adjusted for each pump.

4. The apparatus of claim 1, wherein the outlet channel is connected to a length of tubing having greater volumetric capacity than said sample pump, whereby the suction applied at the open terminus of said tubing by the suction stroke of sample pump will draw back only diluent liquid from the tubing into the pump chamber.

References Cited
UNITED STATES PATENTS

| | | | |
|---|---|---|---|
| 3,127,062 | 3/1964 | Feichtmeir et al. | 23—253 |
| 3,182,692 | 5/1965 | Bittner | 23—259X |
| 3,197,285 | 7/1965 | Rosen | 23—425.6 |
| 3,367,746 | 2/1968 | Maurukas | 23—253 |

S. CLEMENT SWISHER, Primary Examiner

U.S. Cl. X.R.

23—259